United States Patent
Scofield et al.

(10) Patent No.: US 10,035,583 B2
(45) Date of Patent: Jul. 31, 2018

(54) ROTORCRAFT CONTROLS AND ROTORCRAFT INCLUDING SUCH ROTORCRAFT CONTROLS

(71) Applicant: The Boeing Company, Chicago, IL (US)

(72) Inventors: Patrick C. Scofield, Phoenix, AZ (US); Todd C. Brown, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 14/921,878

(22) Filed: Oct. 23, 2015

(65) Prior Publication Data

US 2017/0113783 A1    Apr. 27, 2017

(51) Int. Cl.
  *B64C 27/57* (2006.01)
  *B64C 13/04* (2006.01)
  *G05G 9/047* (2006.01)

(52) U.S. Cl.
  CPC .............. *B64C 13/04* (2013.01); *B64C 27/57* (2013.01); *G05G 9/047* (2013.01); *G05G 2009/04774* (2013.01)

(58) Field of Classification Search
  CPC ......... B64C 13/04; B64C 27/54; B64C 27/56; B64C 27/57; G05G 9/047; G05G 2009/04774; H01H 2025/043; H01H 2025/045
  See application file for complete search history.

(56) References Cited

U.S. PATENT DOCUMENTS

| 4,130,259 | A  | * | 12/1978 | Carlson | B64C 27/56 244/234 |
| 4,667,909 | A  | * | 5/1987 | Curci | B64C 13/12 244/234 |
| 5,403,155 | A  |   | 4/1995 | Head et al. | |
| 5,472,156 | A  |   | 12/1995 | Bivens, III et al. | |
| 8,844,880 | B1 |   | 9/2014 | Corliss | |
| 9,488,054 | B2 | * | 11/2016 | Corpron | F01D 5/12 |
| 9,500,138 | B1 | * | 11/2016 | Cai | F02C 9/54 |
| 2014/0020396 | A1 | * | 1/2014 | Corpron | B64D 31/00 60/772 |

(Continued)

OTHER PUBLICATIONS

Bielawa, Richard L.. (2006). Rotary Wing Structural Dynamics and Aeroelasticity (2nd Edition). American Institute of Aeronautics and Astronautics; pp. 625-648.*

(Continued)

*Primary Examiner* — Tien Q Dinh
*Assistant Examiner* — Michael A. Fabula
(74) *Attorney, Agent, or Firm* — Hanley, Flight & Zimmerman, LLC (57) ABSTRACT

Rotorcraft controls and rotorcraft including such rotorcraft controls. An example apparatus includes a collective control column for an aircraft includes a rotational interface rotatable in a first direction to provide a first input and a second direction opposite the first direction to provide a second input; a memory to store instructions; and a processor responsive to the first input to execute the instructions to cause the aircraft to perform operations associated with flying the aircraft, the processor responsive to the second input to execute the instructions to cause the aircraft to perform operations associated with idling the aircraft.

28 Claims, 10 Drawing Sheets

(56) References Cited

U.S. PATENT DOCUMENTS

2015/0142215 A1* 5/2015 Oltheten ............... B64D 31/06
701/3

OTHER PUBLICATIONS

European Patent Office, "Extended European Search Report," issued in connection with European Patent Application No. 16184909.6, dated Mar. 27, 2017, 7 pages.

* cited by examiner

Some rotorcraft include helicopters and/or turbine helicopters. In some examples, the rotorcraft controls include an example collective lever and/or a collective control column. The example collective control column can be used to change a throttle setting and/or a performance state of the rotorcraft and/or an engine of the rotorcraft. In some examples, the performance state includes a fly state or an idle state.

In some examples, an operator provides a mechanical input to the collective control column that activates a switch to change an electronic state of the rotorcraft. In some examples, the input is provided to a full authority digital engine control (FADEC) system of the rotorcraft and/or a dual FADEC system of the rotorcraft. In some examples, the rotorcraft disclosed include a FADEC system or a dual FADEC system.

In some examples, to change the performance state of the rotorcraft, the collective control column includes an example biased detent ring, a switch ring and/or collar coupled to and/or coaxially coupled to the collective control column. In some examples, the collar is coupled at and/or adjacent a grip of the collective control column. In some examples, the collar is coupled at and/or adjacent an end of the collective control column below, for example, a head of the collective control column. In some examples, by making the collar relatively small and/or coupling the collar adjacent an end of the grip, additional space and/or real estate is provided on the collective control column to couple additional buttons, levers, switches, interfaces, functions, inputs, etc.

In some examples, the collar is rotatable to provide inputs to the rotorcraft. In some examples, the collar is rotatable clockwise to provide a first input and/or to activate a switch to provide the first input. In some examples, the collar is rotatable counterclockwise to provide a second input and/or to activate a switch to provide the second input. In some examples, the collective control column includes a spring to rotationally and linearly bias the collar to a secured, locked and/or a central position. In some examples, the central position is disposed between the first position associated with the first input and the second input position associated with the second input.

In some examples, to enable rotation of the collar relative to the collective control column, an operator urges the collar from a locked and/or secured position against a biasing force of the spring to remove a protrusion from a locking detent, groove and/or aperture. In some examples, after the collar is released from the secured position, the operator can rotate the collar either clockwise or counterclockwise to provide a desired input to the rotorcraft. In some examples, the first input provides a fly input to the rotorcraft and the second input provides an idle input to the rotorcraft. In some examples, if the operator releases the collar when the collar is spaced from the central position, the spring biases and/or urges (e.g., automatically urges) the collar to a secured, central, detent and/or neutral position.

In some examples, the example collar is disposed on the example collective control column to enable an operator to move the collar with two and/or three motions (e.g., three overt motions) to provide a first input and/or a second input to the rotorcraft. In some examples, to unlock and/or release the example collar, the collar is gripped between a thumb and forefinger of an operator and then moved longitudinally. In some examples, the collar includes surface structures and/or ridges that enable the operator to determine a rotational position of the collar relative to the collective control column. In some examples, to unlock and/or release the

ROTORCRAFT CONTROLS AND ROTORCRAFT INCLUDING SUCH ROTORCRAFT CONTROLS

FIELD OF THE DISCLOSURE

This disclosure relates generally to collective rotorcraft controls and, more particularly, to rotorcraft controls and rotorcraft including such rotorcraft controls.

BACKGROUND

Rotorcraft such as helicopters use rotors to provide lift and/or thrust. Using such rotors enables the rotorcraft to fly forward, backward, laterally and/or hover.

SUMMARY

An example apparatus includes a collective control column for an aircraft includes a rotational interface rotatable in a first direction to provide a first input and a second direction opposite the first direction to provide a second input; a memory to store instructions; and a processor responsive to the first input to execute the instructions to cause the aircraft to perform operations associated with flying the aircraft, the processor responsive to the second input to execute the instructions to cause the aircraft to perform operations associated with idling the aircraft.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The examples disclosed herein relate to rotorcraft controls and/or example rotorcraft having such rotorcraft controls.

collar, the collar is moved between about 0.95 inches and 0.127 inches. In some examples, the distance to transition the collar from the secured position to the released position corresponds to a length of a detent that secures the protrusion in the secured position. In some examples, a resistance is overcome when moving the collar from the locked and/or secured position to the unlocked and/or released position.

In some examples, to provide a first input to the collective control column and/or the rotorcraft, the collar is rotated in a first direction. In some examples, to provide a second input to the collective control column and/or the rotorcraft, the collar is rotated in a second direction. In some examples, a first resistance is overcome to rotate the collar in the first direction and a second resistance is overcome to rotate the collar in the second direction. In some examples, the first resistance is the same as or similar to the second resistance. In some examples, the first resistance is different than the second resistance. In examples in which the first and second resistances are different, a first spring having a first spring force may be overcome when urging the collar in the first direction and a second spring having a second spring force may be overcome when urging the collar in the second direction. For example, when rotating the collar in the first direction to provide a fly input, a lesser amount of resistance is overcome than when rotating the collar in the second direction to provide an idle input. In some examples, the first input is received when the collar is rotated approximately 45 degrees in the first direction and the second input is received when the collar is rotated approximately 45 degrees in the second direction. In some examples, after the collar is rotated and the operator releases the collar, a spring(s) urges and/or biases the collar back to the neutral, secured, central, locked and/or latched position.

Figure 1:
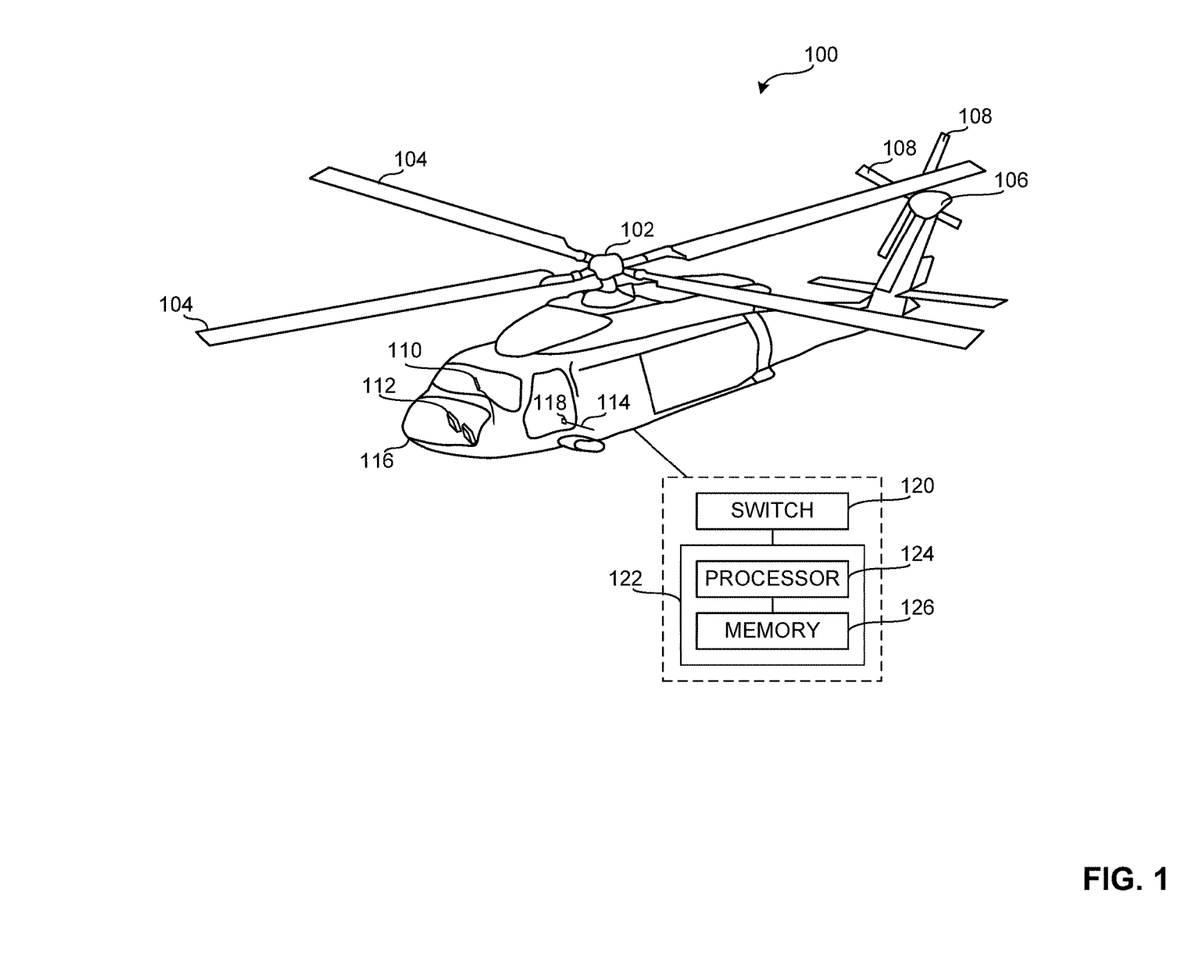
FIG. 1 illustrates an example rotorcraft including an example collective control column.

FIG. 1 illustrates an example rotorcraft, helicopter and/or turbine helicopter 100 including a main rotor 102 including main rotary blades 104 and a tail rotor 106 including tail rotor blades 108. In this example, to control the flight of the helicopter 100, the helicopter 100 includes an example cyclic stick 110, example anti-torque pedals 112 and an example collective lever and/or a collective control column 114.

In some examples, to enable the helicopter 100 to move in a particular direction (e.g., forward, right, left, etc.), the cyclic stick 110 is used to change a pitch angle and/or a feathering angle of the rotor blades 104 and/or 108. In some examples, to change a thrust of the tail rotor 106, the anti-torque pedals 112 are used to, for example, increase or reduce a thrust of the tail rotor 106 and/or to cause a nose 116 of the helicopter 100 to yaw in a desired direction. In some examples, to enable the helicopter 100 to increase and/or decrease the lift obtained from the main rotor 102, the collective control column 114 is used to change a pitch angle of all of the main rotor blades 104 collectively. For example, if an input is obtained from the collective control column 114 when the helicopter 100 is level, the helicopter 100 will ascend (e.g., climb) or descend. In some examples, if an input is obtained from the collective control column 114 when the helicopter 100 is pitched forward, the helicopter 100 will accelerate forward with an amount of ascent.

To enable input to be received relating to an operational state of the helicopter 100, the example collective control column 114 includes a thrust and/or throttle control 118. In some examples, the thrust control 118 provides an input(s) to a switch 120 that is coupled to a computer 122. In this example, the computer 122 is positioned on the rotorcraft 100 and includes a processor 124 and a memory 126.

In examples in which the input includes a fly input, in some examples, the processor 124 executes instructions stored on the memory 126 to cause the helicopter 100 to ascend and/or for a torque of the main rotor blades 104 to increase. In examples in which the input includes an idle input, in some examples, the processor 124 executes instructions stored on the memory 126 to cause the helicopter 100 to descend and/or for a torque of the main rotor blades 104 to decrease.

Figure 2:
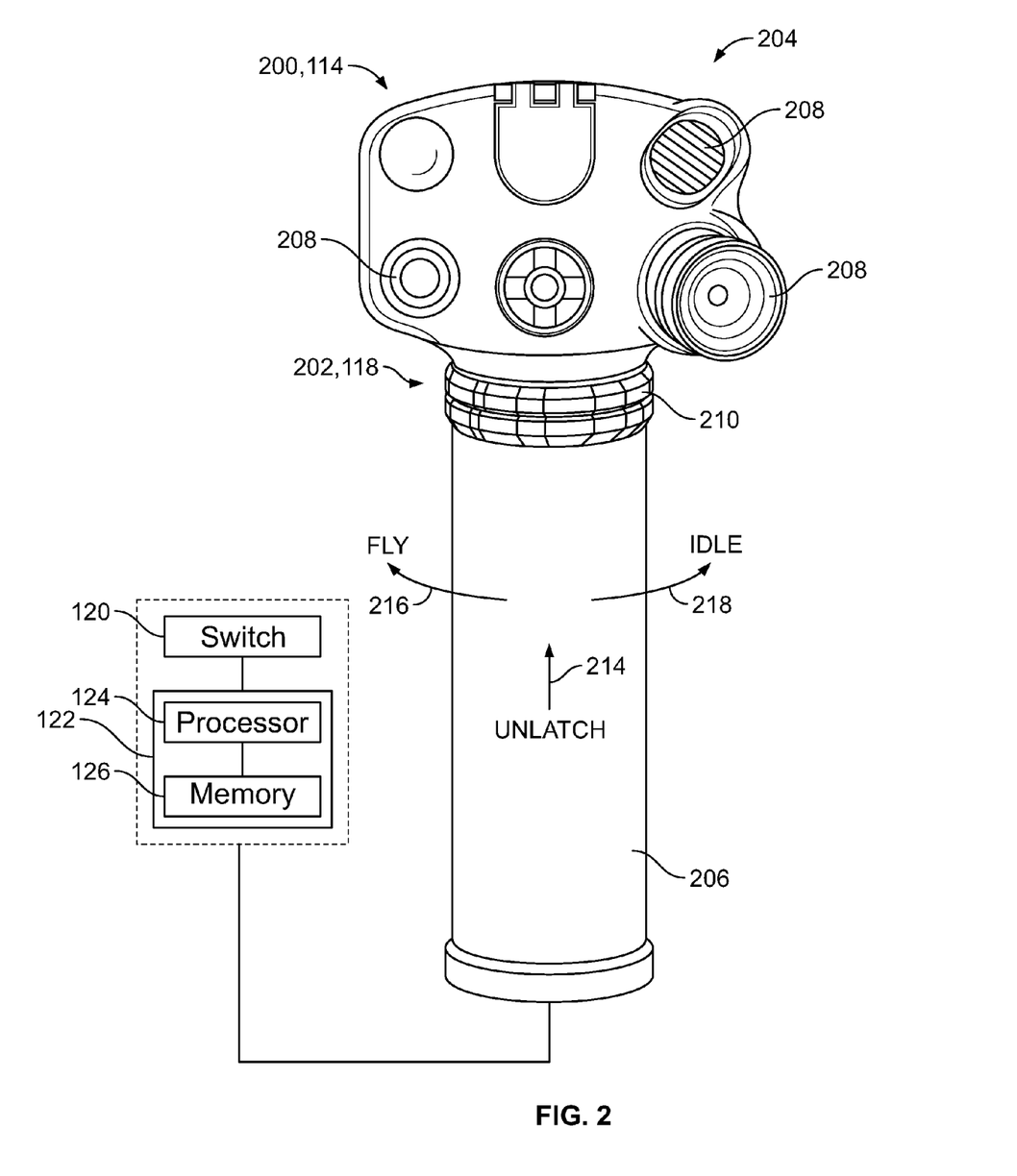
FIG. 2 illustrates a front view of an example collective control column that can be used to implement the example collective control column of FIG. 1.
Figure 3:
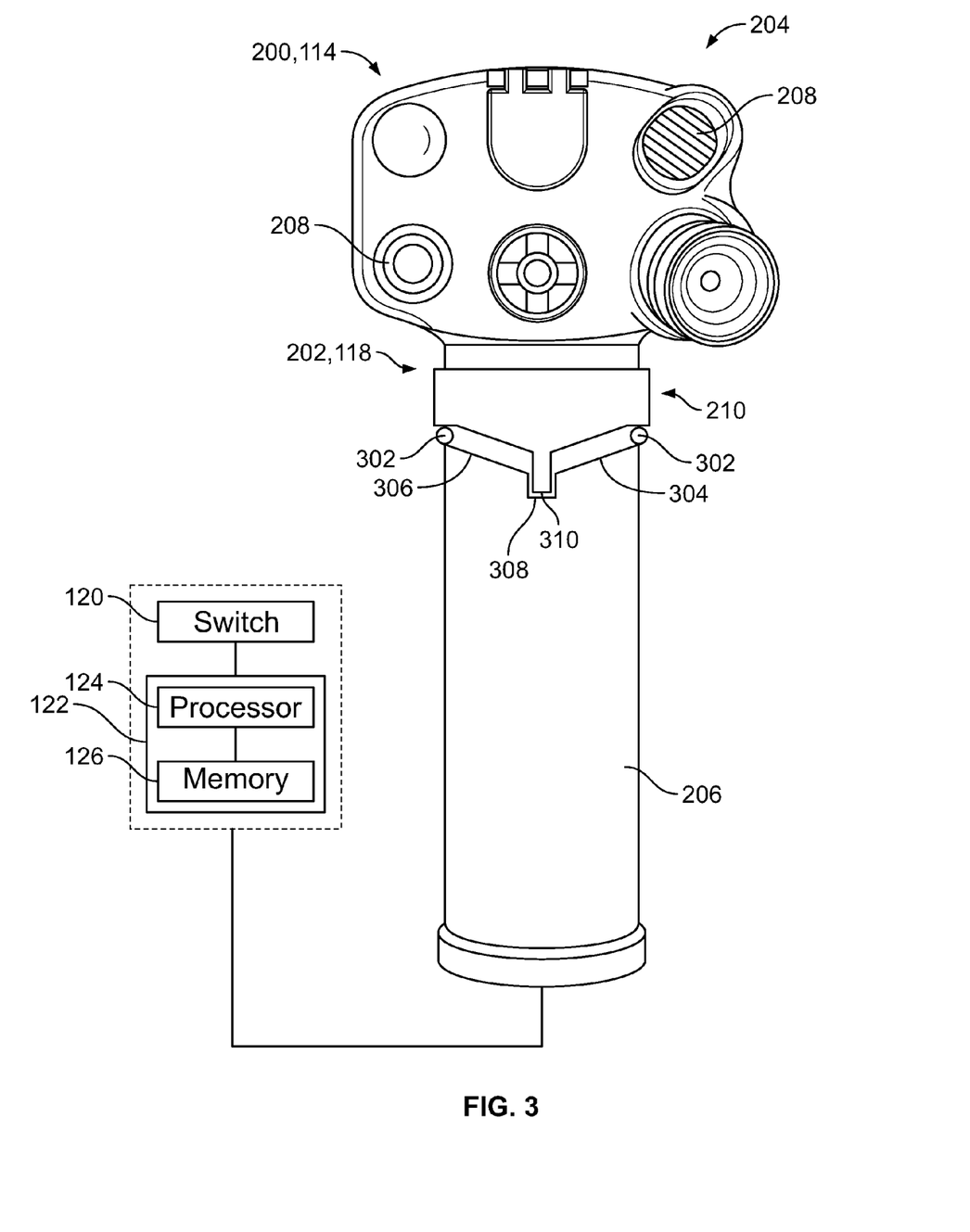
FIG. 3 illustrates a front, partial, cross-sectional view of the example collective control column of FIG. 2 showing example structure to rotationally and linearly bias an example collar.
Figure 4:
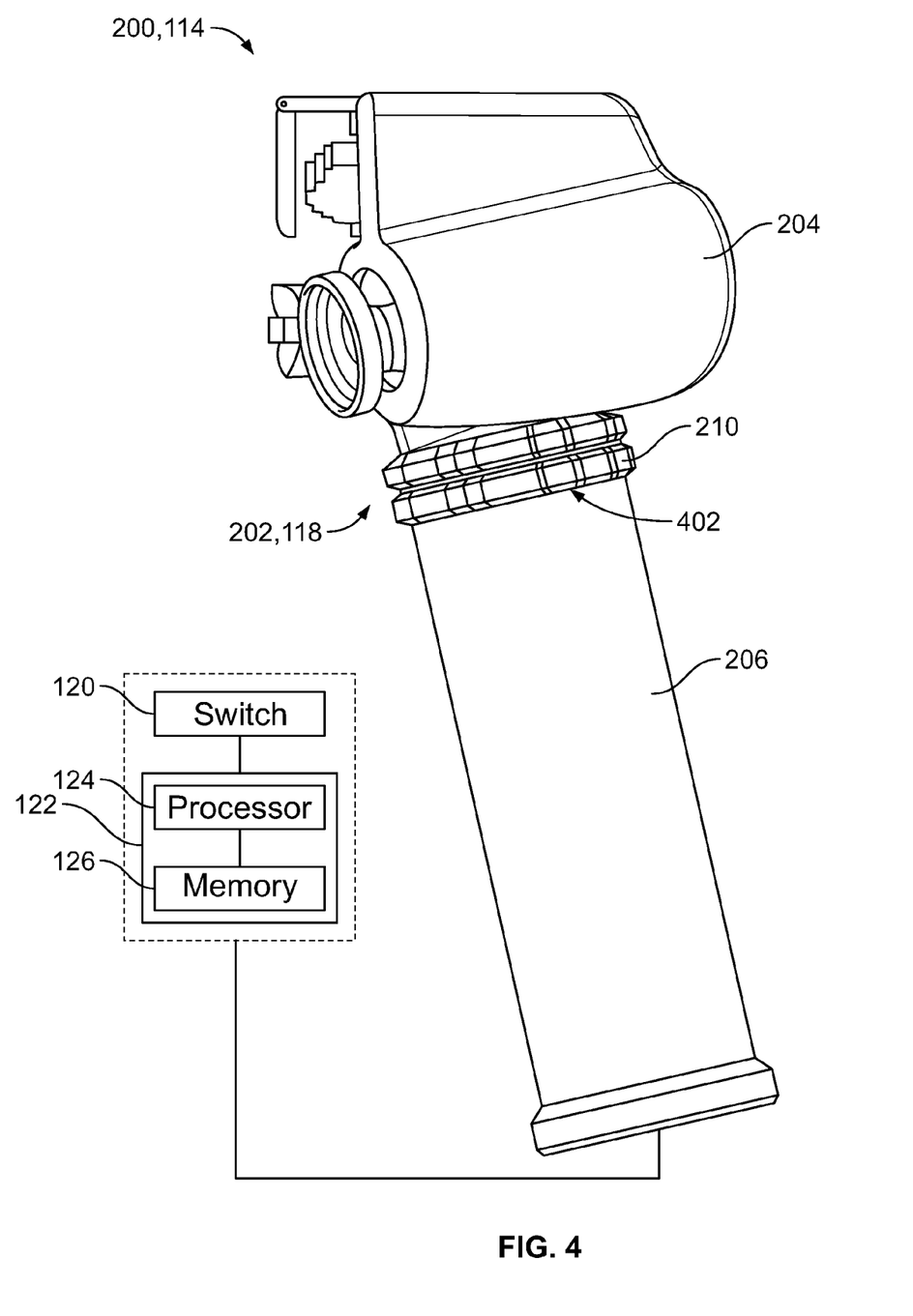
FIG. 4 illustrates a side view of the example collective control column of FIG. 2.

FIGS. 2-4 illustrate different views of an example collective lever and/or a collective control column 200 including an example thrust control 202 that can be used to implement the example collective control column 114 of FIG. 1 and the example thrust control 118 of FIG. 1, respectively. In this example, the example collective control column 200 includes an example head 204, the example thrust control 202 and an example grip 206 where the thrust control 202 is disposed between the example head 204 and the example grip 206. In some examples, to enable a mechanical input to be received by the switch 120, the switch 120 is disposed within the collective control column 200 and/or adjacent the thrust control 202.

In the illustrated example, the head 204 includes buttons and/or switches 208 to provide input(s) to the switch 120 and/or the computer 122. In the illustrated example, the thrust control 202 is implemented as an example collar and/or ring 210 that surrounds at least a portion of the grip 206 and/or is coaxially disposed on the grip 206. In some examples, to provide an input to the switch 120 and/or the computer 122 from the collar 210, the collar 210 is moved in a direction generally indicated by arrow 214 to release, unlock and/or enable the collar 210 to rotate. After the collar 210 is released from the secured position, the collar 210 is rotated in a first direction generally indicated by arrow 216 or in a second direction generally indicated by arrow 218.

In some examples, rotating the collar 210 in the first direction 216 provides an input to the switch 120 associated with a fly input that causes the processor 124 to execute instructions stored on the memory 126 to cause the helicopter 100 to perform functions associated with flying, ascending and/or accelerating the helicopter 100. In some examples, rotating the collar 210 in the second direction 218 provides an input to the switch 120 associated with an idle input that causes the processor 124 to execute instructions stored on the memory 126 to cause the helicopter 100 to perform functions associated with idling, descending and/or decelerating the helicopter 100.

As shown in the example partial cross-sectional view of FIG. 3, to enable the collar 210 to return to a neutral, secured and/or central position, a spring and/or a wave spring 302 is disposed between the collar 210 and surfaces (e.g. tapered surfaces) 304, 306 of the grip 206. As shown in the illustrated example, to enable the collar 210 to return to the neutral and/or central position, the grip 206 includes the tapered surfaces 304, 306 that lead to a groove and/or detent 308 defined by the grip 206. Thus, if the collar 210 is removed from the detent 308 and rotated either in the first direction 216 and/or the second direction 218 and the collar 210 is released, the spring 302 urges a protrusion, key and/or follower 310 of the collar 210 against one of the tapered surfaces 304, 306 and the tapered surfaces 304, 306 urge the follower 310 into the detent 308. In this example, when the follower 310 is disposed in the detent 308, the collar 210 is substantially secured against further rotation. While the example of FIG. 3 illustrates a manner of linearly and/or rotationally biasing the collar 210 into a central and/or secured position, the collar 210 may be linearly and/or rotationally biased in any other suitable manner.

FIG. 4 illustrates a side view of the example collective control column 200 including the head 204, the example thrust control 202 including the example collar 210 and the example grip 206. As shown in the illustrated example, the example collar 210 includes surface structures, grooves and/or ribs 402 that are radically spaced and/or configured about the circumference of the collar 210 to indicate a rotational position of the collar 210 relative to the grip 206 and/or a longitudinal axis of the grip 206. The rotational position of the collar 210 may indicate that the collar 210 is providing a fly input to the switch 120 and/or providing an idle input to the switch 120, etc.

Figure 5:
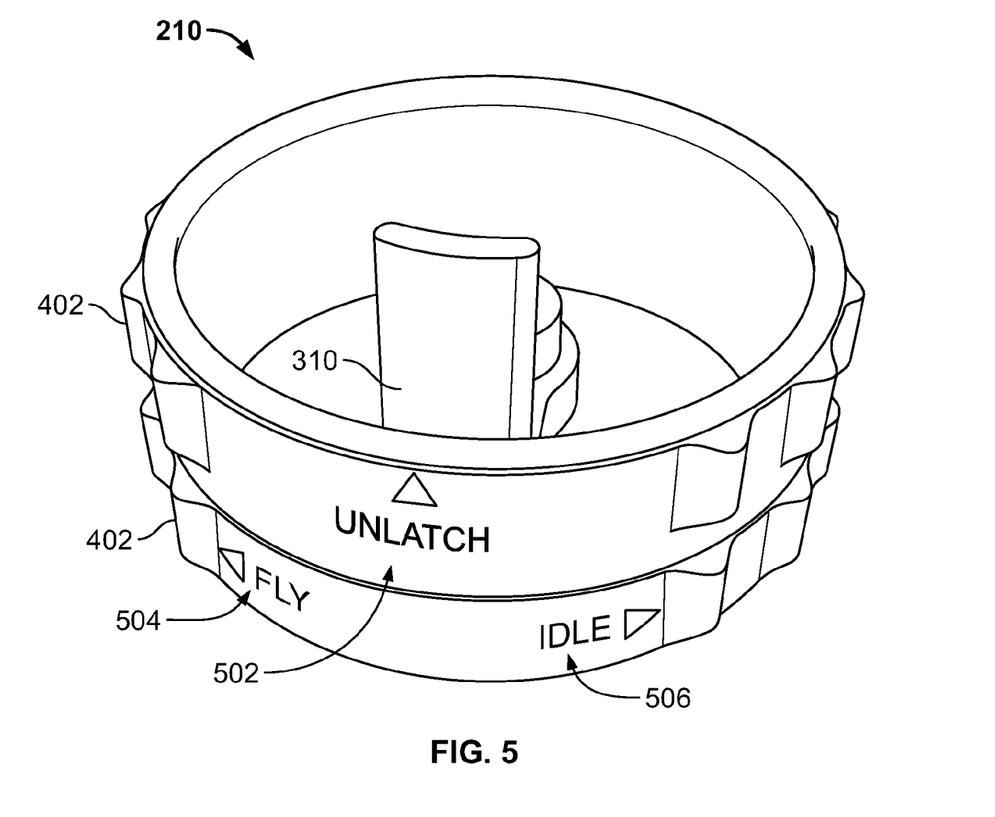
FIG. 5 illustrates a perspective view of an example collar that can be used to implement the example collective control column of FIG. 2.

FIG. 5 illustrates a perspective view of the example collar 210 including the protrusion 310 and the ribs 402. In the illustrated example, the collar 210 includes a first visual indicator and/or etching 502 associated with a direction to move the collar 210 to unlatch, release and/or unsecure the collar 210, a second visual indicator and/or etching 504 associated with rotating the collar 210 to provide a fly input and a third visual indicator and/or etching 506 associated rotating the collar 210 to provide an idle input.

Figure 6:
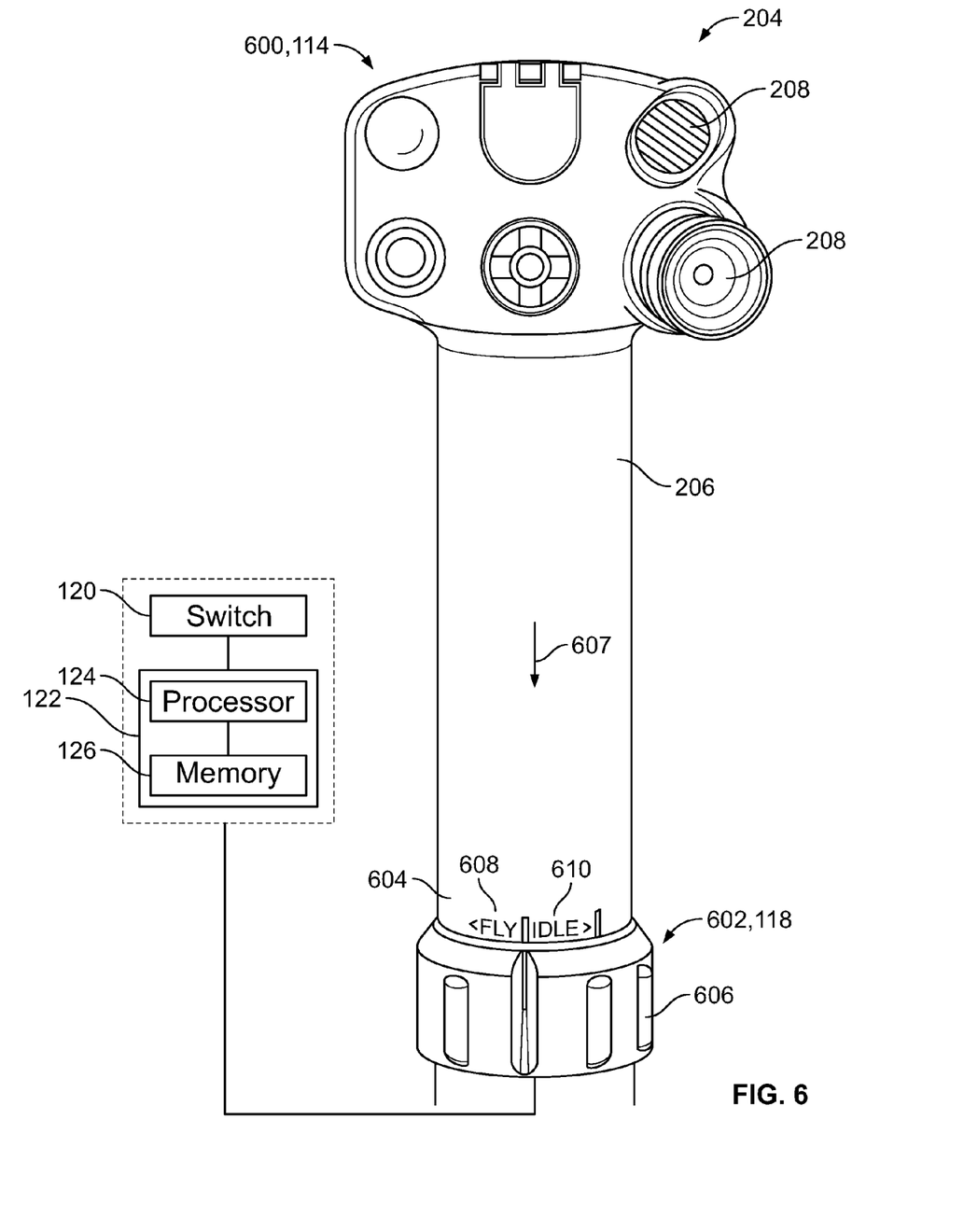
FIG. 6 illustrates a front view of another example collective control column that can be used to implement the example collective control column of FIG. 1.
Figure 7:
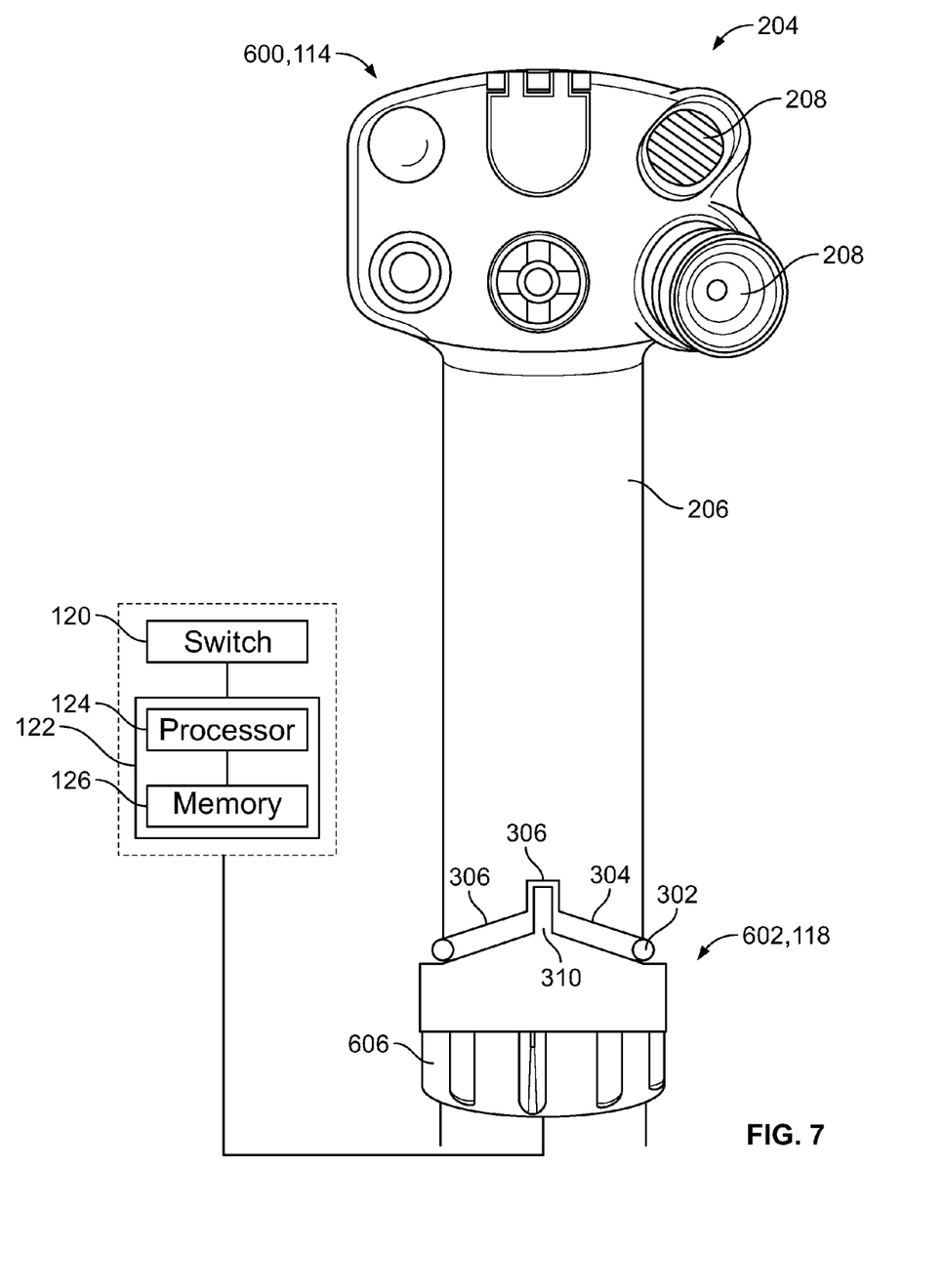
FIG. 7 illustrates a front, partial cross-sectional view of the example collective control column of FIG. 6 showing example structure to rotationally and linearly bias an example collar.
Figure 8:
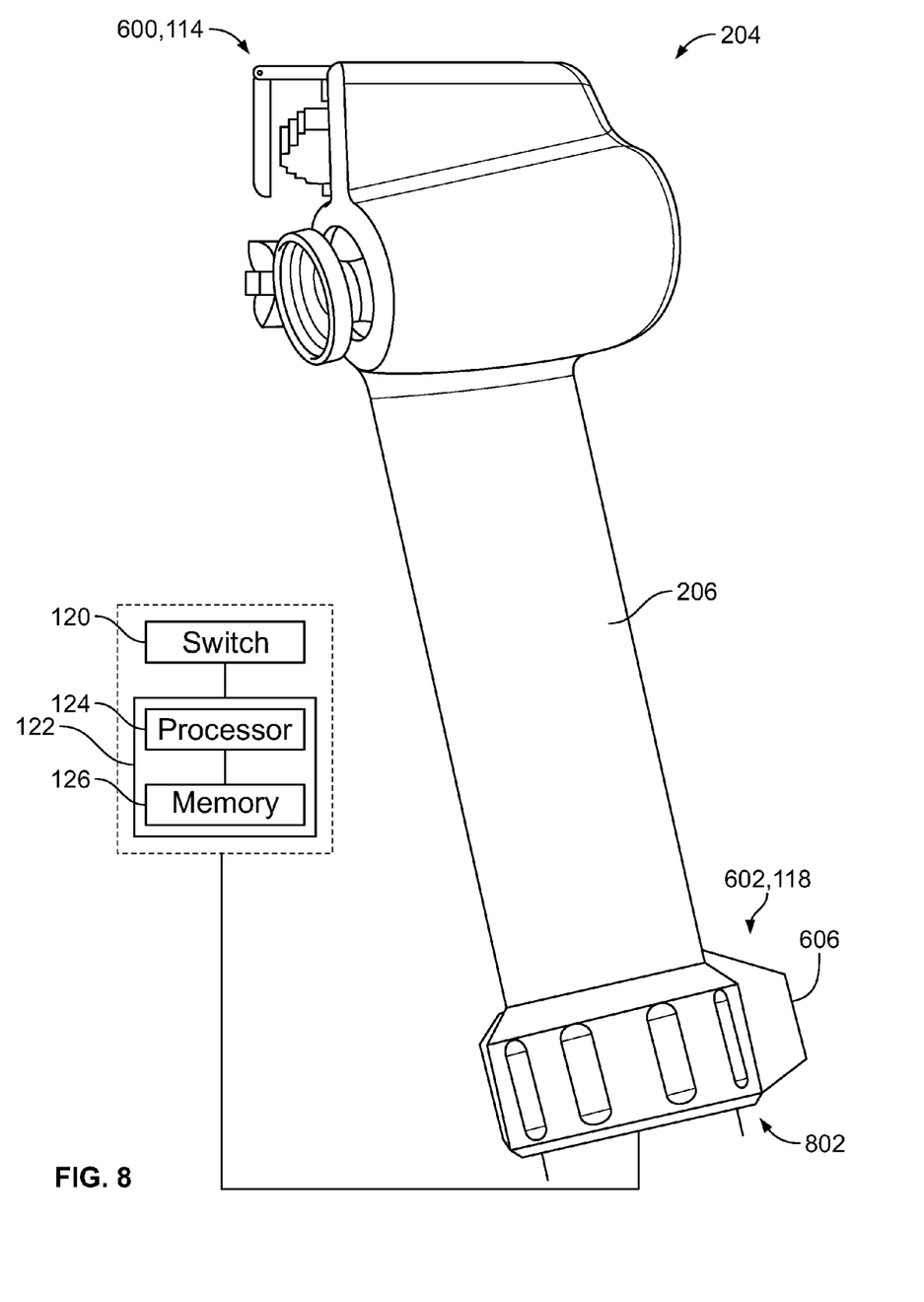
FIG. 8 illustrates a side view of the example collective control column of FIG. 6.

FIGS. 6-8 illustrate an example collective lever and/or a collective control column 600 including an example thrust control 602 that can be used to implement the example collective control column 200 and the example thrust control 202, respectively. The example collective control column 600 and the example thrust control 602 are similar to the example lever 200 and the example thrust control 202 of FIG. 2, respectively. However, in contrast to the example thrust control 202 of FIG. 2, the thrust control 602 of FIG. 6 is disposed at a base 604 of the grip 206 as opposed to being disposed between the head 204 and the grip 206.

In some examples, to provide an input to the switch 120 and/or the computer 122 from a collar 606 of the thrust control 602, the collar 606 is moved in a direction generally indicated by arrow 607 to unsecure, unlock and/or enable the rotation of the collar 606. In some examples, after the collar 606 is unlocked, the collar 210 is rotated in a first direction generally indicated by arrow 608 or in a second direction generally indicated by arrow 610.

In some examples, rotating the collar 210 in the first direction 608 provides an input to the switch 120 associated with a fly input that causes the processor 124 to execute instructions stored on the memory 126 to cause the helicopter 100 to perform functions associated with flying, ascending and/or accelerating the helicopter 100. In some examples, rotating the collar 606 in the second direction 610 provides an input to the switch 120 associated with an idle input that causes the processor 124 to execute instructions stored on the memory 126 to cause the helicopter 100 to perform functions associated with idling, descending and/or decelerating the helicopter 100.

As shown in the example partial cross-sectional view of FIG. 7, the collar 606 is biased in a similar manner as the collar 210 of FIG. 3. However, in contrast to the collar 210 of FIG. 2, the tapered surfaces 304, 306, the detent 308 and the protrusion 310 are inverted relative to, for example, a longitudinal axis of the grip 206.

FIG. 8 illustrates a side view of the example collective control column 600 including the head 204, the example thrust control 602 including the example collar 606 and the example grip 206. As shown in the illustrated example, the example collar 606 includes surface structures, grooves, protrusions and/or ribs 802 that are spaced and/or configured to indicate a rotational position of the collar 606 relative to the grip 206. In some examples, the protrusions 802 assist an operator in unsecuring, unlatching and/or rotating the collar 210 relative to the grip 206 and/or provide an indication of a rotational position of the collar 606 relative to the grip 206. In some examples, the rotational position of the collar 606 may indicate that the collar 606 is providing a fly input to the switch 120 and/or providing an idle input to the switch 120, etc.

While an example manner of implementing the example switch 120, the example computer 122, the example processor 124 and the example memory 126 are illustrated in FIGS. 1-4 and FIGS. 6-8, one or more of the elements, processes and/or devices illustrated in FIGS. 1-4 and FIGS. 6-8 may be combined, divided, re-arranged, omitted, eliminated and/or implemented in any other way. Further, the example switch 120, the example computer 122, the example processor 124 and the example memory 126 illustrated in FIGS. 1-4 and FIGS. 6-8 may be implemented by hardware, software, firmware and/or any combination of hardware, software and/or firmware. Thus, for example, any of the example switch 120, the example computer 122, the example processor 124 and the example memory 126 illustrated in FIGS. 1-4 and FIGS. 6-8 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example switch 120, the example computer 122, the example processor 124 and the example memory 126 are illustrated in FIGS. 1-4 and FIGS. 6-8 is/are hereby expressly defined to include a tangible computer readable storage device or storage disk such as a memory, a digital versatile disk (DVD), a compact disk (CD), a Blu-ray disk, etc. storing the software and/or firmware. Further still, the example switch 120, the example computer 122, the example processor 124 and the example memory 126 are illustrated in FIGS. 1-4 and FIGS. 6-8 may include one or more elements, processes and/or devices in addition to, or instead of, those illustrated and/or may include more than one of any or all of the illustrated elements, processes and devices.

Figure 9:
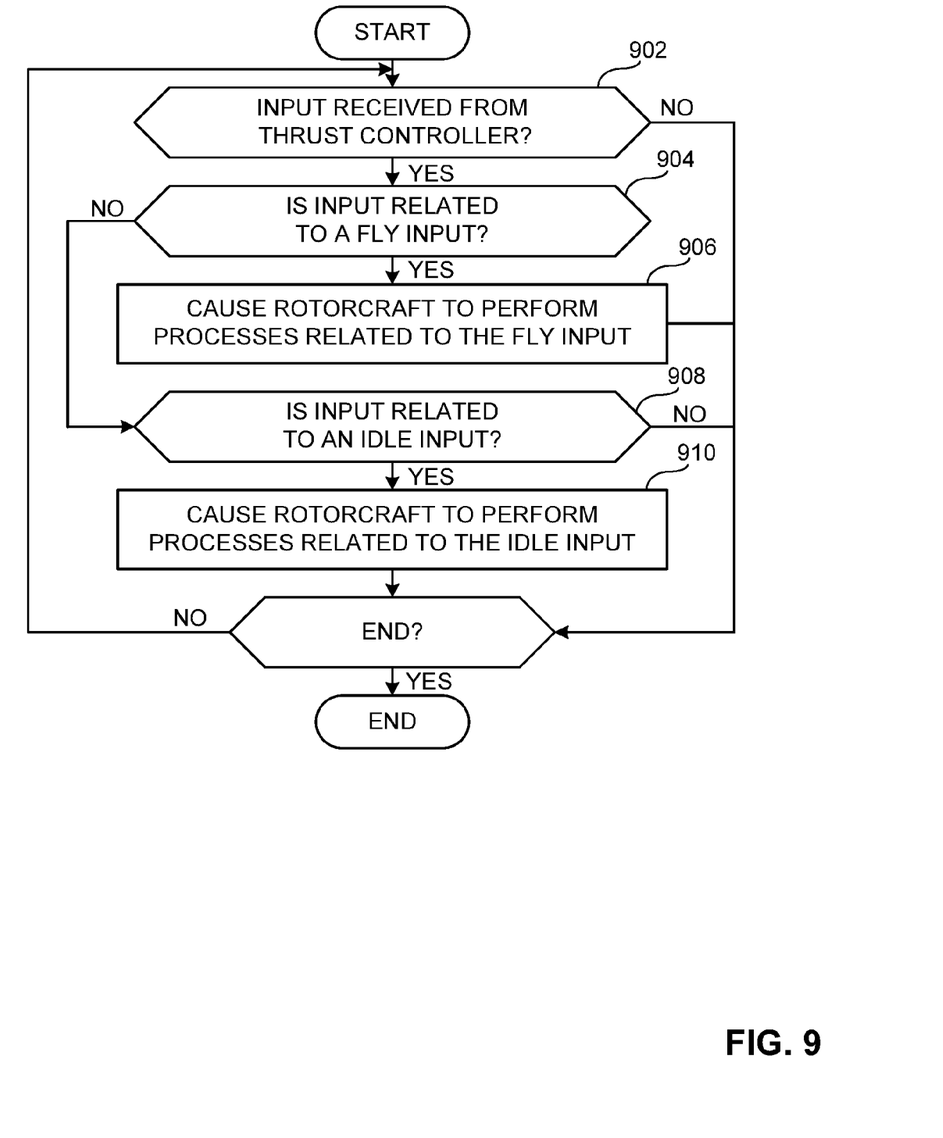
FIG. 9 illustrates an example method that may be performed to implement the example rotorcraft of FIG. 1.

A flowchart representative of an example method for implementing the helicopter 100 of FIG. 1, the example collective control columns 114, 200, 600, the example switch 120, the example computer 122, the example processor 124, 1012 and/or the example memory 126 is shown in FIG. 9. In this example, the method may be implemented using machine readable instructions that comprise a program for execution by a processor such as a processor 1012 shown in an example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example the helicopter 100 of FIG. 1, the example collective control columns 114, 200, 600, the example switch 120, the example computer 122, the example processor 124 and/or the example memory 126 may alternatively be used. For example, the order of execution of the blocks may be changed, and/or some of the blocks described may be changed, eliminated, or combined.

As mentioned above, the example method of FIG. 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example method of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The method of FIG. 9 may begin by determining if an input has been received (block 902) by, for example, the processor 124, 1012 determining if an input has been received from the switch 120 and/or from the thrust control 118, 202 and/or 602. In some examples, an input is received when the thrust control 118, 202 and/or 602 and/or the collar 210, 606 of the thrust control 118, 202 and/or 602 is rotated clockwise and/or counterclockwise to cause an input to be received by the switch 120 and/or for the switch to be tripped.

If an input is received, it is determined if the input is related to a fly input (block 904) by, for example, the processor 124, 1012 determining and/or identifying that a first input has been received from the switch 120 and/or the thrust control 118, 202 and/or 602. In some examples, the fly input is received when an operator rotates the thrust control 118, 202, 602 and/or the collar 210, 606 of the thrust control 118, 202 and/or 602 approximately 45 degrees clockwise until the switch 120 is tripped. In some examples, the switch 120 is disposed within the thrust control 118, 202, 602 and/or adjacent the collar 210, 606

If the fly input is received, the rotorcraft is caused to perform processes related to the fly input (block 906) by, for example, the processor 124, 1012 executing instructions stored on the memory 126 to cause the helicopter 100 to perform functions associated with flying, ascending and/or accelerating the helicopter 100.

If a fly input is not received, it is determined if the input is related to an idle input (block 908) by, for example, the processor 124, 1012 determining and/or identifying that a second input has been received from the switch 120 and/or the thrust control 118, 202 and/or 602. In some examples, the idle input is received when an operator rotates the thrust control 118, 202, 602 and/or the collar 210, 606 of the thrust control 118, 202 and/or 602 approximately 45 degrees counterclockwise until the switch 120 is tripped.

If the idle input is received, the rotorcraft is caused to perform processes related to the idle input (block 910) by, for example, the processor 124, 1012 executing instructions stored on the memory 126 to cause the helicopter 100 to perform functions associated with idling, descending and/or decelerating.

Figure 10:
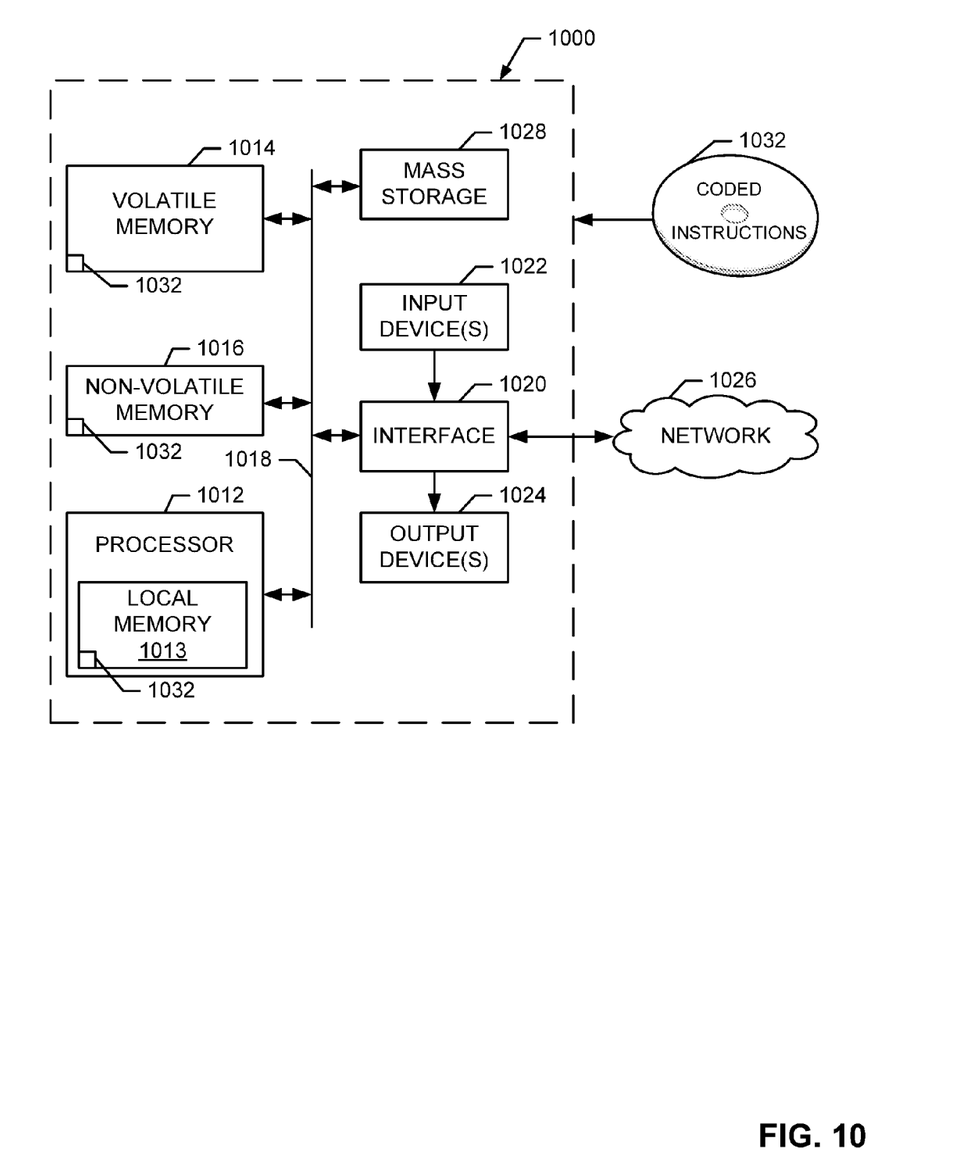
FIG. 10 is a processor platform that may be used to implement the method of FIG. 9 and the example rotorcraft of FIG. 1.

FIG. 10 is a block diagram of the example processor platform 1000 capable of executing the instructions of FIG. 9 to implement the helicopter 100 of FIG. 1, the example collective control columns 114, 200, 600, the example switch 120, the example computer 122, the example processor 124 and/or the example memory 126. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes the processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a haptic feedback device, an audible signal device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 of FIG. 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture relate to collective levers and/or collective control columns for aircraft (e.g., rotorcraft, helicopters, etc.) that, for example, eliminate a separate throttle quadrant and/or rotational grip on the collective lever and/or reduce and/or eliminate mechanical interconnections between cockpits for the collective lever and/or the thrust control. In some examples, the example thrust controls disclosed herein reduce weight and enable more room and/or real estate to be available to couple additional switches, interfaces, buttons, etc., to the grip. For example, switches, interfaces, buttons, etc., may be coupled below the head (e.g., on the grip) of the collective lever. In some examples, the example thrust controls disclosed herein reduce cost by reducing an amount of mechanical hardware (e.g., eliminating linkages between the cockpits, reducing internal wire passage issues, etc.) used to implement the example thrust controls.

In some examples, when the aircraft is off, the example collar of the example thrust control is in a normal, neutral and/or center position. After the pilot enters the aircraft, the pilot may move the engine switch to the on/start position and the aircraft starts by introducing fuel to the engine(s). Once the starter engages, the engine switch may be released from the start position.

In some examples, the pilot can transition the aircraft from idle to fly by unlatching the example collar of the example thrust control and rotating the example collar approximately 45 degrees. However, in other examples, the collar may be rotated any amount (e.g., 20 degrees, 25 degrees, 30 degrees, etc.) to enable an input (e.g., a first input, a second input, etc.) to be received. In some examples, when a fly input is received, the aircraft rotor system accelerates from a ground idle speed to a different speed (e.g., a speed associated with flying the aircraft). In some examples, after the fly input is received, the aircraft rotor system accelerates to a flight speed based on an acceleration schedule stored on a memory to enable the aircraft to fly.

In some examples, the pilot can transition the aircraft from fly to idle by unlatching the example collar of the example thrust control and rotating the example collar approximately 45 degrees. In some examples, when an idle input is received, the aircraft rotor system decelerates from a fly speed to a different speed (e.g., a speed associated with idling the aircraft). In some examples, after the idle input is received, the aircraft rotor system decelerates to an idle speed based on a deceleration schedule stored in a memory, for example.

In some examples, the pilot can transition the aircraft from fly to idle in flight by unlatching the example collar of the example thrust control and rotating the example collar approximately 45 degrees. In some examples, when an idle input is received, the aircraft rotor system decelerates from a fly speed to a different speed based on a deceleration schedule stored in a memory, for example (e.g., a speed associated with idling the aircraft).

In some examples, the pilot can transition the aircraft rotor system from idle to fly in flight by unlatching the example collar of the example thrust control column and rotating the example collar approximately 45 degrees. In some examples, when a fly input is received, the aircraft rotor system accelerates from the idle speed to a different speed based on an acceleration schedule stored in a memory, for example (e.g., a speed associated with accelerating the aircraft).

In some examples, the pilot can transition the aircraft from fly to idle on the ground by unlatching the example collar of the example thrust control and rotating the example collar approximately 45 degrees. In some examples, when an idle input is received, the aircraft rotor system decelerates from the fly speed to a different speed based on a deceleration schedule stored in a memory, for example (e.g., a speed associated with idling the aircraft).

An example apparatus includes a collective control column for an aircraft includes a rotational interface rotatable in a first direction to provide a first input and a second direction opposite the first direction to provide a second input; a memory to store instructions; and a processor responsive to the first input to execute the instructions to cause the aircraft to perform operations associated with flying the aircraft, the processor responsive to the second input to execute the instructions to cause the aircraft to perform operations associated with idling the aircraft.

In some examples, the rotational interface includes a collar that least partially surrounds the collective control column. In some examples, the collar includes surface structures on an exterior surface of the collar to indicate a rotational position of the collar relative to a longitudinal axis of the collective control column. In some examples, the collar includes a follower to be biased into engagement with a surface of the collective control column. In some examples, the collar is to be longitudinally and rotationally biased to a central position between a first position of the collar associated with the first input and a second position of the collar associated with the second input. In some examples, in the central position, the follower is to be received in a detent to substantially secure the collar against inadvertent rotation.

In some examples, the collar is movable relative to a longitudinal axis of the collective control column to remove the follower from the detent and to enable the collar to be rotatable in either of the first direction or the second direction. In some examples, the collective control column includes a grip and a head, the rotational interface being disposed between the grip and the head. In some examples, the apparatus includes a switch responsive to the rotating of the rotational interface in the first direction or the rotating of the rotational interface in the second direction, the switch being coupled to the processor to enable the processor to receive the first input or the second input.

An example apparatus includes a collective control column including a rotatable ring to enable switchable electronic control of an engine performance state between a first state associated with flight engine control and a second state associated with idle engine control, the ring being coaxially mounted to the collective column. In some examples, the rotational ring is releasable to enable rotation of the ring by moving the ring relative to a longitudinal axis of the control column to enable a protrusion to be removed from a detent. In some examples, the apparatus includes a spring to longitudinally and rotationally bias the ring to a central position between a first position associated with the first state and a second position associated with the second position. In some examples, the collar includes a follower to be urged into engagement with a tapered surface or a detent of the collective control column, an interaction between the spring and the collar and between the follower and the tapered surface to bias the follower to be disposed in the detent. In some examples, the rotational ring is disposed adjacent a base or a head of the collective control column.

An example apparatus includes a rotorcraft including main rotor blades and tail rotor blades; a collective control column disposed in the rotorcraft, the collective control column including a rotational interface rotatable in a first direction to provide a first input and a second direction opposite the first direction to provide a second input; a memory to store instructions; and a processor responsive to the first input to execute the instructions to cause the rotorcraft to perform operations associated with flying the rotorcraft, the processor responsive to the second input, the processor to execute the instructions to cause the rotorcraft to perform operations associated with idling the aircraft.

In some examples, the rotational interface includes a collar that least partially surrounds the collective control column, the collar being rotationally and longitudinally biased by a spring relative to a longitudinal axis of the collective control column. In some examples, the collar is movable from a secured position that substantially prevents rotation of the collar to a released position that enables the collar to be rotated in the first direction and rotated in the second direction. In some examples, in the secured position, a protrusion of the collar is received in a detent of the collective control column, the collar being movable relative to the longitudinal axis to remove the protrusion from the detent and to enable a transition of the collar from the secured position to the released position. In some examples, the collar includes a follower to be urged into engagement with a tapered surface or a detent of the collective control column, an interaction between the spring and the collar and between the follower and the tapered surface to encourage the follower to be disposed in the detent. In some examples, the apparatus includes In some examples, a switch responsive to the rotating of the rotational interface in the first direction or the rotating of the rotational input in the second direction, the switch being coupled to the processor to enable the processor receive to the first input or the second input.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a collective control column for an aircraft, the collective control column includes:
   a rotational interface rotatable in a first direction to provide a first input and a second direction opposite the first direction to provide a second input, the collective control column including tapered surfaces engageable by the rotational interface and structured to encourage the rotational interface to be in a first position between a second position associated with the first input and a third position associated with the second input;
   a memory to store instructions; and
   a processor responsive to the first input to execute the instructions to cause the aircraft to perform operations associated with flying the aircraft, the processor responsive to the second input to execute the instructions to cause the aircraft to perform operations associated with idling the aircraft.

2. The apparatus of claim 1, wherein the rotational interface includes a collar that at least partially surrounds the collective control column.

3. The apparatus of claim 2, wherein the collar includes surface structures on an exterior surface of the collar to indicate a rotational position of the collar relative to a longitudinal axis of the collective control column.

4. The apparatus of claim 2, wherein the collar includes a follower structured to be biased into engagement with a surface of the collective control column.

5. The apparatus of claim 4, wherein the collar is structured to be longitudinally and rotationally biased to a central position between a first position of the collar associated with the first input and a second position of the collar associated with the second input.

6. The apparatus of claim 5, wherein the collective control column includes a detent, in the central position, the follower is to be received in the detent to substantially secure the collar against inadvertent rotation.

7. The apparatus of claim 6, wherein the collar is movable relative to a longitudinal axis of the collective control column to remove the follower from the detent and to enable the collar to be rotatable in either of the first direction or the second direction after the follower is removed from the detent.

8. The apparatus of claim 1, wherein the collective control column includes a grip and a head, the rotational interface being disposed between the grip and the head.

9. The apparatus of claim 1, further including a switch responsive to the rotating of the rotational interface in the first direction or the rotating of the rotational interface in the second direction, the switch being coupled to the processor to enable the processor to receive the first input or the second input.

10. An apparatus, comprising:
    a collective control column, including:
    a tapered surface; and
    a rotatable ring to engage the tapered surface, the rotatable ring to enable switchable electronic control of an engine performance state between a first state associated with flight engine control and a second state associated with idle engine control, the ring being coaxially mounted to the collective control column, the tapered surface structured to encourage the rotatable ring to be in a first position between a second position associated with the first state and a third position associated with the second state.

11. The apparatus of claim 10, wherein the rotational ring is releasable to enable rotation of the ring by moving the ring relative to a longitudinal axis of the control column to enable a protrusion to be removed from a detent.

12. The apparatus of claim 10, further including a spring to longitudinally and rotationally bias the ring to the first position between the second position associated with the first state and the third position associated with the second position.

13. The apparatus of claim 12, wherein the collective control column includes a detent, the ring includes a follower to be urged into engagement with the tapered surface or the detent of the collective control column, an interaction between the spring and the ring and between the follower and the tapered surface to bias the follower to be disposed in the detent.

14. The apparatus of claim 10, wherein the rotational ring is disposed adjacent a base or a head of the collective control column.

15. An apparatus, comprising:
a rotorcraft including main rotor blades and tail rotor blades;
a collective control column disposed in the rotorcraft, the collective control column, including:
tapered surfaces;
a rotational interface to engage the tapered surface, the rotational interface rotatable in a first direction to provide a first input and a second direction opposite the first direction to provide a second input, the tapered surfaces to encourage the rotational interface to be in a first position between a second position associated with the first input and a third position associated with the second input;
a memory to store instructions; and
a processor responsive to the first input to execute the instructions to cause the rotorcraft to perform operations associated with flying the rotorcraft, the processor responsive to the second input, the processor to execute the instructions to cause the rotorcraft to perform operations associated with idling the rotorcraft.

16. The apparatus of claim 15, wherein the rotational interface includes a collar that least partially surrounds the collective control column, the collar being rotationally and longitudinally biased by a spring relative to a longitudinal axis of the collective control column.

17. The apparatus of claim 16, wherein the collar is movable from a secured position that substantially prevents rotation of the collar to a released position that enables the collar to be rotated in the first direction and rotated in the second direction.

18. The apparatus of claim 17, wherein, in the secured position, a protrusion of the collar is received in a detent of the collective control column, the collar being movable relative to the longitudinal axis to remove the protrusion from the detent and to enable a transition of the collar from the secured position to the released position.

19. The apparatus of claim 16, wherein the collar includes a follower to be urged into engagement with a tapered surface or a detent of the collective control column, an interaction between the spring and the collar and between the follower and the tapered surface to encourage the follower to be disposed in the detent.

20. The apparatus of claim 15, further including a switch responsive to the rotating of the rotational interface in the first direction or the rotating of the rotational rotational interface in the second direction, the switch being coupled to the processor to enable the processor receive to the first input or the second input.

21. An apparatus, comprising:
a collective control column for an aircraft, the collective control column, including:
a rotational interface rotatable in a first direction to provide a first input and a second direction opposite the first direction to provide a second input, the collective control column including means for encouraging the rotational interface to be disposed in a first position between second and third positions associated with the first input and the second input.

22. The apparatus of claim 21, wherein the collective control column includes a grip having an outer surface, the rotational interface being outwardly offset relative to the outer surface.

23. The apparatus of claim 22, wherein the rotational interface includes a chamfer that extends outwardly relative to the outer surface.

24. The apparatus of claim 23, wherein the rotational interface is disposed at an end of the grip.

25. The apparatus of claim 22, further including radially disposed ribs extending outwardly from the rotational interface.

26. The apparatus of claim 25, wherein the means for encouraging the rotational interface to be disposed in the first position between the second and third positions associated with the first input and the second input includes opposing tapered surfaces engageable by a follower of the rotational interface.

27. The apparatus of claim 26, further including a detent to receive the follower disposed between the opposing tapered surfaces.

28. The apparatus of claim 22, further including surface structures extending outwardly from the rotational interface to facilitate the rotation of the rotational interface.

* * * * *